(12) United States Patent
Raether (10) Patent No.: US 9,126,132 B2
(45) Date of Patent: Sep. 8, 2015

(54) AIR FILTER ASSEMBLY HAVING VENTURI ELEMENTS WITH EXTENDED PULSE OUTLETS

(71) Applicant: Donaldson Company, Inc., Minneapolis, MN (US)

(72) Inventor: Thomas D. Raether, St. Louis Park, MN (US)

(73) Assignee: DONALDSON COMPANY, INC., Bloomington, MN (US)

( * ) Notice: Subject to any disclaimer, the term of this patent is extended or adjusted under 35 U.S.C. 154(b) by 125 days.

(21) Appl. No.: 13/896,585

(22) Filed: May 17, 2013

(65) Prior Publication Data

US 2013/0305667 A1    Nov. 21, 2013

Related U.S. Application Data

(60) Provisional application No. 61/648,492, filed on May 17, 2012.

(51) Int. Cl.
*B01D 46/00* (2006.01)
*B01D 46/24* (2006.01)
*B01D 46/42* (2006.01)

(52) U.S. Cl.
CPC .......... *B01D 46/0042* (2013.01); *B01D 46/002* (2013.01); *B01D 46/0021* (2013.01); *B01D 46/0068* (2013.01); *B01D 46/2411* (2013.01); *B01D 46/4281* (2013.01)

(58) Field of Classification Search
CPC ........ B01D 46/02; B01D 46/10; B01D 46/21; B01D 46/42; B01D 46/68; B01D 46/2411; B01D 46/4281

USPC ............. 55/301–302, 341.1–341.2, 498–499, 55/501, 521; 95/280

See application file for complete search history.

(56) References Cited

U.S. PATENT DOCUMENTS

| | | | |
|---|---|---|---|
| 3,942,962 | A | 3/1976 | Duyckinck |
| 4,073,632 | A | 2/1978 | Reinauer et al. |

(Continued)

FOREIGN PATENT DOCUMENTS

| | | |
|---|---|---|
| DE | 93 11 201 | 10/1993 |
| DE | 20 2006 005677 | 7/2006 |
| JP | 2006 095004 | 4/2006 |

OTHER PUBLICATIONS

U.S. Appl. No. 61/648,492, filed May 17, 2012, Raether.

(Continued)

*Primary Examiner* — Jason M Greene
*Assistant Examiner* — Karla Hawkins
(74) *Attorney, Agent, or Firm* — Mueting Raasch & Gebhardt, P.A.

(57) ABSTRACT

Air filtering assemblies described herein include one or more venturi elements that include extended pulse outlets. The pulse outlets may, in one or more embodiments, include two regions between the throat of the venturi element and the distal end of the pulse outlet that diverge at different rates. In one or more embodiments, the venturi elements may include openings at the distal ends of their pulse outlets that have non-circular cross-sectional shapes. In one or more embodiments, the non-circular cross-sectional shapes of the openings at the distal ends of the pulse outlets of the venturi elements may be selected to match non-circular openings in the filter elements attached to the pulse outlets of the venturi elements.

30 Claims, 10 Drawing Sheets

(56) References Cited

U.S. PATENT DOCUMENTS

| | | |
|---|---|---|
| 4,159,197 A | 6/1979 | Schuler et al. |
| 4,218,227 A | 8/1980 | Frey |
| 4,395,269 A | 7/1983 | Schuler |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 4,652,285 A | 3/1987 | Greene |
| 4,661,131 A | 4/1987 | Howeth |
| 4,880,530 A | 11/1989 | Frey |
| 4,954,255 A | 9/1990 | Muller et al. |
| 5,207,812 A | 5/1993 | Tronto et al. |
| 5,211,846 A | 5/1993 | Kott et al. |
| 5,222,488 A | 6/1993 | Forsgren |
| 5,562,746 A | 10/1996 | Raether |
| 5,730,766 A | 3/1998 | Clements |
| 6,090,173 A * | 7/2000 | Johnson et al. .......... 55/302 |
| 6,902,592 B2 | 6/2005 | Green et al. |
| 7,641,708 B2 | 1/2010 | Kosmider et al. |
| 8,075,648 B2 | 12/2011 | Raether |
| 2004/0079231 A1 | 4/2004 | Green et al. |
| 2009/0217630 A1 | 9/2009 | Bitner |

OTHER PUBLICATIONS

U.S. Appl. No. 61/648,494, filed May 17, 2012, Raether.
U.S. Appl. No. 13/896,564, filed May 17, 2013, Raether.
International Search Report and Written Opinion for PCT/US2013/041541 from the European Patent Office, dated Jul. 4, 2013; 14 pgs.
International Preliminary Report on Patentability for PCT/US2013/041541 issued by the International Bureau of WIPO; dated Nov. 27, 2014; 12 pgs.

* cited by examiner

AIR FILTER ASSEMBLY HAVING VENTURI ELEMENTS WITH EXTENDED PULSE OUTLETS

CROSS-REFERENCE TO RELATED APPLICATIONS

The present application claims priority to U.S. Provisional Application Ser. No. 61/648,492, filed on May 17, 2012, which is incorporated herein by reference in its entirety.

Air filtering systems having venturi elements with extended pulse outlets and methods of using the same of using air filtering systems including these components are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Systems for cleaning an air or other gas stream laden with particulate matter include air filter assemblies that have filter elements disposed in a housing. The filter element may be a bag, sock or cartridge including a suitable filter media, e.g., fabric, pleated paper, etc. The gas stream contaminated with particulate matter is typically passed through the housing so that the particulate matter is captured and retained by one or more filter elements.

In a standard design of air filter assembly, an air filter assembly has a clean air chamber and a dirty air chamber. The two chambers are separated by a structure that is commonly referred to as a tube sheet. The tube sheet has a number of openings so that air can pass between the clean and dirty air chambers. The filter elements are positioned over the openings so that particulate-laden air (dirty air) introduced into the dirty air chamber must pass through a filter element to move into the clean air chamber. The particulate matter in the dirty air collects on the filter elements as the air moves through the filter elements. From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter elements capture particulate matter, flow through the system is inhibited and periodic cleaning of the filter elements can be performed to increase air flow through the system. Cleaning can be accomplished by periodically pulsing a brief jet of pressurized air into the interior of the filter element to reverse the air flow through the filter element, causing the collected particulate matter to be driven off of the filter element. The pressurized air may be directed into venturi elements as described in, e.g., U.S. Pat. No. 3,942,962 (Duyckinck), U.S. Pat. No. 4,218,227 (Frey), U.S. Pat. No. 6,090,173 (Johnson et al.), U.S. Pat. No. 6,902,592 (Green et al.), and U.S. Pat. No. 7,641,708 (Kosmider et al.).

SUMMARY

The air filter assemblies described herein include one or more venturi elements that include extended pulse outlets. In one or more embodiments, the pulse outlets may include two regions between the throat of the venturi element and the distal end of the pulse outlet that diverge at different rates.

In one or more embodiments, the venturi elements may include openings at the distal ends of their pulse outlets that have non-circular cross-sectional shapes. In one or more embodiments, the non-circular cross-sectional shapes of the openings at the distal ends of the pulse outlets of the venturi elements may be selected to match non-circular openings in the filter elements attached to the pulse outlets of the venturi elements.

The features of the venturi elements described herein may improve flow through the venturi elements, resulting in, e.g., reduced pressure drop, flow velocity, etc.

In one aspect, one or more embodiments of the air filter assemblies described herein include: a housing comprising a tube sheet separating the housing into a dirty air chamber and a clean air chamber; a plurality of venturi elements attached to the tube sheet, wherein each venturi element of the plurality of venturi elements comprises a throat located between a pulse inlet and a pulse outlet, wherein a venturi axis extends through a geometric center of the throat and a distal end of the pulse outlet; a plurality of apertures in the tube sheet, wherein each venturi element of the plurality of venturi elements is positioned over or through an aperture in the tube sheet such that air passing from the dirty air chamber into the clean air chamber through each venturi element of the plurality of venturi elements passes through the aperture; and a plurality of filter elements, wherein each filter element of the plurality of filter elements is positioned at the distal end of the pulse outlet of a venturi element to receive air passing out of the pulse outlet of each venturi element of the plurality of venturi elements; wherein the pulse outlet of each venturi element of the plurality of venturi elements comprises a first expansion region and a second expansion region, wherein the first expansion region is located between the throat and the second expansion region; wherein the first expansion region comprises opposing walls that diverge at a first angle; wherein the second expansion section comprises opposing walls that diverge at a second angle that is larger than the first angle; and wherein the second expansion section comprises a second length along the venturi axis that is greater than a first length of the first expansion section along the venturi axis.

In one or more embodiments, the pulse outlet of each venturi element of the plurality of venturi elements comprises a pulse outlet length along the venturi axis that is larger than a pulse inlet length as measured from a distal end of the pulse inlet to the throat along the venturi axis.

In one or more embodiments, the second length of the second expansion section is greater than a pulse inlet length as measured from a distal end of the pulse inlet to the throat along the venturi axis for each venturi element of the plurality of venturi elements.

In one or more embodiments, the first angle is about 15 degrees or less for each venturi element of the plurality of venturi elements.

In one or more embodiments, the second angle is about 7 degrees or more for each venturi element of the plurality of venturi elements.

In one or more embodiments, the distal end of the pulse inlet of each venturi element of the plurality of venturi elements is attached to the tube sheet such that the pulse outlet, the throat and the pulse inlet are located in the dirty air chamber.

In one or more embodiments, the pulse outlet of each venturi element of the plurality of venturi elements comprises a cross-sectional opening shape at the distal end that is non-circular.

In one or more embodiments, the non-circular cross-sectional opening shape at the distal end of the pulse outlet of each venturi element of the plurality of venturi elements matches an opening shape of the filter element positioned at the distal end of the venturi element.

In one or more embodiments, the non-circular cross-sectional opening shape at the distal end of the pulse outlet of each venturi element of the plurality of venturi elements matches a non-circular cross-sectional opening shape at the throat of each venturi element.

In one or more embodiments, the non-circular cross-sectional opening shape at the distal end of the pulse outlet of each venturi element of the plurality of venturi elements matches a non-circular cross-sectional opening shape at a distal end of the pulse inlet of each venturi element.

In one or more embodiments, the air filter assembly further comprises a pulse jet cleaning system comprising a plurality of blowpipes oriented to direct a pulse of air into the pulse inlets and towards the throats of each venturi element of the plurality of venturi elements. In one or more embodiments, each blowpipe of the plurality of blowpipes is configured to provide a shaped pulse that matches a cross-sectional opening shape at a distal end of the pulse outlet of each venturi element. In one or more embodiments, each blowpipe of the plurality of blowpipes is configured to provide a shaped pulse that matches a cross-sectional opening shape at the throat of each venturi element. In one or more embodiments, each blowpipe of the plurality of blowpipes is configured to provide a shaped pulse that matches a cross-sectional opening shape at a distal end of the pulse inlet of each venturi element.

In one or more embodiments, each venturi element of the plurality of venturi elements comprises one or more channels and wherein a support member of a yoke attached to the venturi element is located within the one or more channels.

In a second aspect, one or more embodiments of the air filter assemblies described herein includes: a housing comprising a tube sheet separating the housing into a dirty air chamber and a clean air chamber; a plurality of venturi elements attached to the tube sheet, wherein each venturi element of the plurality of venturi elements comprises a throat located between a pulse inlet and a pulse outlet, wherein a venturi axis extends through a geometric center of the throat and a distal end of the pulse outlet; a plurality of apertures in the tube sheet, wherein each venturi element of the plurality of venturi elements is positioned over or through an aperture in the tube sheet such that air passing from the dirty air chamber into the clean air chamber through each venturi element of the plurality of venturi elements passes through the aperture; and a plurality of filter elements, wherein each filter element of the plurality of filter elements is positioned at the distal end of the pulse outlet of a venturi element to receive air passing out of the pulse outlet of each venturi element of the plurality of venturi elements; wherein the pulse outlet of each venturi element of the plurality of venturi elements comprises a cross-sectional opening shape at the distal end that is non-circular.

In one or more embodiments of the second aspect, the non-circular cross-sectional opening shape at the distal end of the pulse outlet of each venturi element of the plurality of venturi elements matches an opening shape of the filter element positioned at the distal end of the venturi element.

In one or more embodiments of the second aspect, the non-circular cross-sectional opening shape at the distal end of the pulse outlet of each venturi element of the plurality of venturi elements matches a non-circular cross-sectional opening shape at the throat of each venturi element.

In one or more embodiments of the second aspect, the non-circular cross-sectional opening shape at the distal end of the pulse outlet of each venturi element of the plurality of venturi elements matches a non-circular cross-sectional opening shape at a distal end of the pulse inlet of each venturi element.

In one or more embodiments of the second aspect, the pulse outlet of each venturi element of the plurality of venturi elements comprises a pulse outlet length along the venturi axis that is larger than a pulse inlet length as measured from a distal end of the pulse inlet to the throat along the venturi axis.

In one or more embodiments of the second aspect, the pulse outlet of each venturi element of the plurality of venturi elements comprises a first expansion region and a second expansion region, wherein the first expansion region is located between the throat and the second expansion region, wherein the first expansion region comprises opposing walls that diverge at a first angle, and wherein the second expansion section comprises opposing walls that diverge at a second angle that is larger than the first angle.

In one or more embodiments of the second aspect, the second expansion section comprises a second length along the venturi axis that is greater than a pulse inlet length as measured from a distal end of the pulse inlet to the throat along the venturi axis for each venturi element of the plurality of venturi elements.

In one or more embodiments of the second aspect, the first angle is about 15 degrees or less for each venturi element of the plurality of venturi elements.

In one or more embodiments of the second aspect, the second angle is about 7 degrees or more for each venturi element of the plurality of venturi elements.

In one or more embodiments of the second aspect, the distal end of the pulse inlet of each venturi element of the plurality of venturi elements is attached to the tube sheet such that the pulse outlet, the throat and the pulse inlet are located in the dirty air chamber.

In one or more embodiments of the second aspect, each venturi element of the plurality of venturi elements comprises one or more channels and wherein a support member of a yoke attached to the venturi element is located within the one or more channels.

The above summary is not intended to describe each embodiment or every implementation of the air filter assemblies and methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 1:
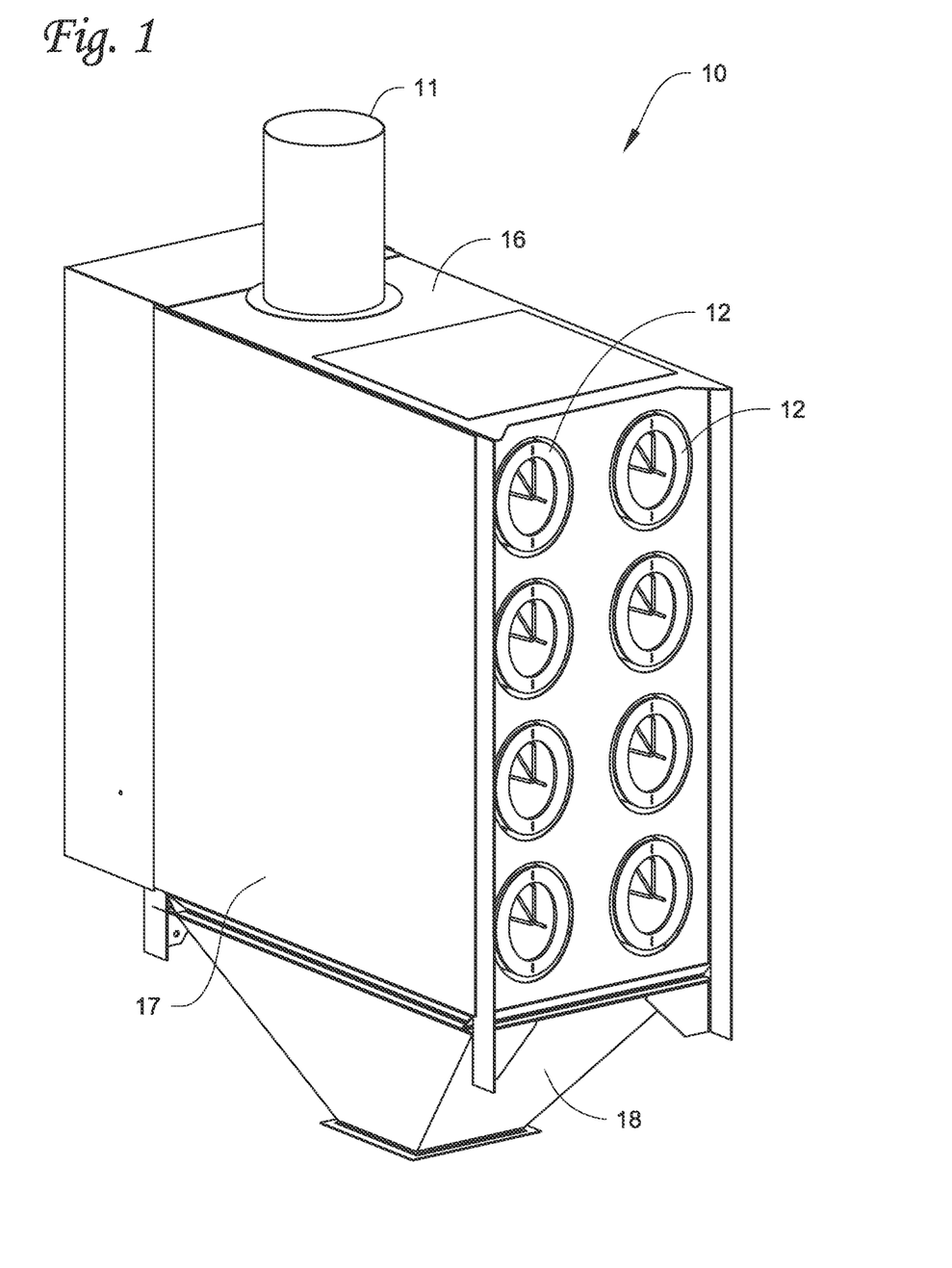
FIG. 1 is a perspective view of one illustrative embodiment of an air filter assembly as described herein.

Referring to FIGS. 1-4, one illustrative embodiment of an air filter assembly is depicted generally at 10. The air filter assembly depicted in FIG. 1 is generally in the shape of a box and includes an upper wall panel 16, and two pairs of opposite side wall panels 17 (one of which is depicted in FIG. 1). The air filter assembly 10 includes a dirty air conduit 11 for receiving dirty or contaminated air (i.e., air with particulate matter therein) into the filter assembly 10. A clean air conduit 13 (see, e.g., FIGS. 3 and 4) may be provided for venting clean or filtered air from the filter assembly 10. The air filter assembly 10 includes access openings 12 for eight filter elements (not shown in FIG. 1) configured together in a side-by-side arrangement. In use, each of the access openings 12 is sealed by a cover (not shown) such that dirty air entering the air filter assembly 10 does not escape through the access openings 12.

The air filter assembly may also include a hopper 18 to collect particulate matter separated from the dirty air stream as described herein. The hopper 18 may include sloped walls to facilitate collection of the particulate matter and may, in some embodiments, include a driven auger or other mechanism for removing the collected particulate matter.

Figure 2:
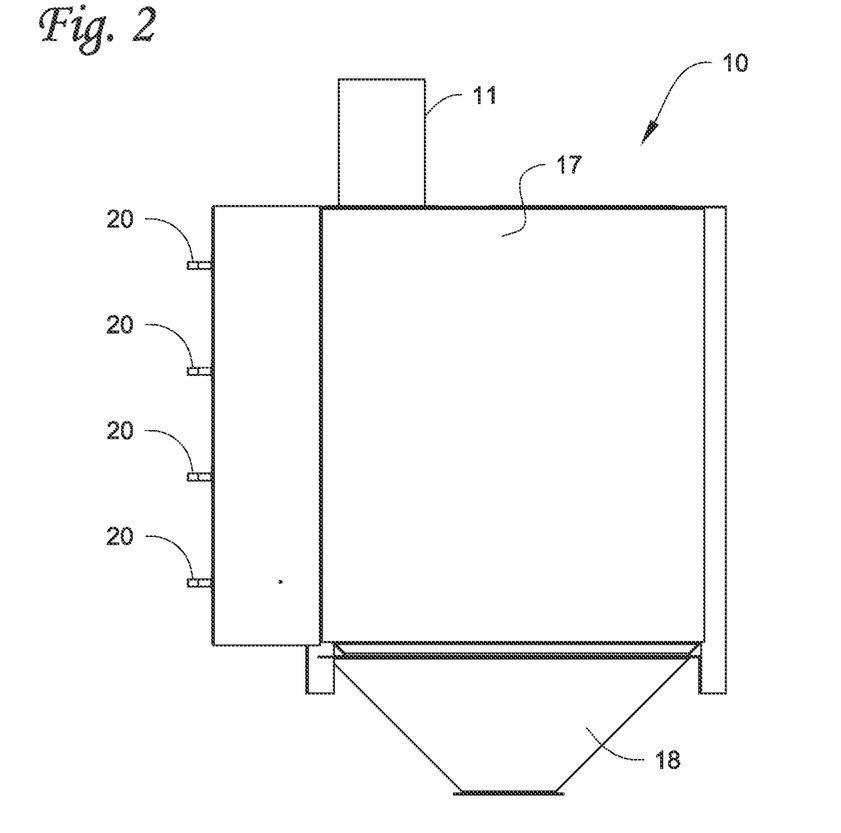
FIG. 2 is a side view of the air filter assembly depicted in FIG. 1.
Figure 3:
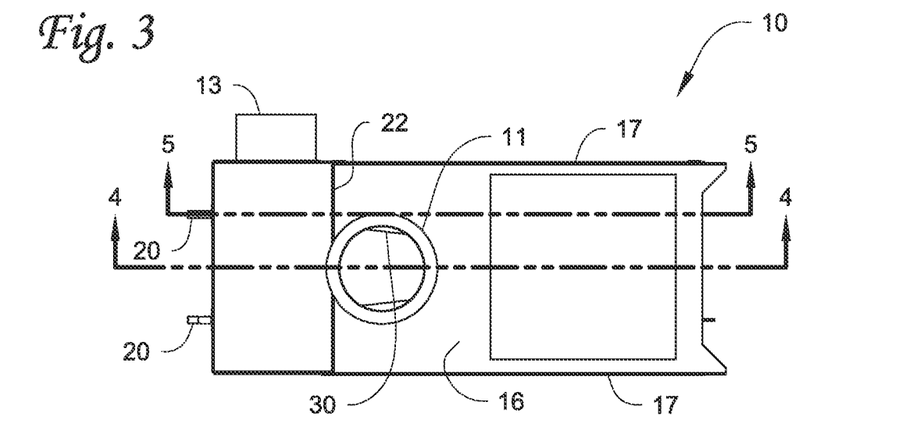
FIG. 3 is a top view of the air filter assembly depicted in FIGS. 1 and 2.

The air filter assembly of FIG. 1 is depicted in a side elevation in FIG. 2 and a top plan view in FIG. 3. The air filter assembly 10, as seen in FIGS. 2 and 3, includes blowpipes 20 as part of a pulse-jet cleaning system, with the blowpipes 20 configured to direct a pulse of air into the filter elements as described herein.

Figure 4:
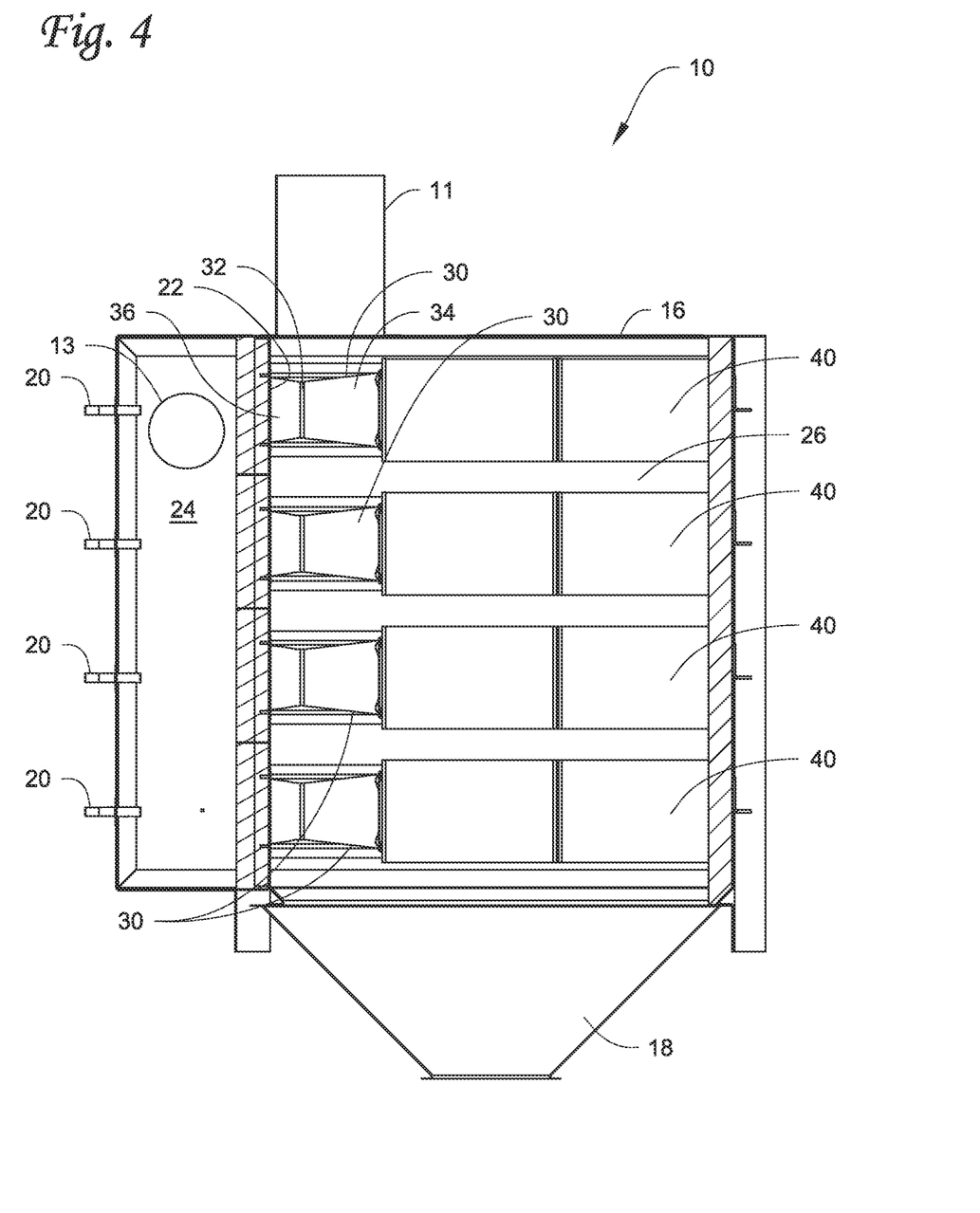
FIG. 4 is a cross-sectional view of the air filter assembly of FIGS. 1-3 taken along line 4-4 in FIG. 3.

FIG. 4 is a cross-sectional view of the air filter assembly 10 taken along line 4-4 in FIG. 3 and shows the interior of the air filter assembly 10. The interior of the air filter assembly includes a tube sheet 22 that separates the interior of the housing into a clean air chamber 24 and a dirty air chamber 26. As depicted in FIGS. 3 and 4, the air filter assembly 10 includes a clean air conduit 13 through which clean air exits from the clean air volume during operation of the air filter assembly 10.

The depicted air filter assembly 10 includes venturi elements 30 and filter elements 40 in the dirty air volume 26. In particular, each of the venturi elements 30 includes a throat 32, a pulse outlet 34 and a pulse inlet 36. The venturi elements 30 are attached to the tube sheet 22 over an opening (not seen in FIG. 4) such that a pulse of air from the blow pipes 20 passing through the venturi element 30 enters the pulse inlet 36. Each venturi element 30 includes a throat 32 located between a pulse inlet 36 and the pulse outlet 34 where the throat 32 is the portion of the venturi element 30 at which air flow through the venturi element 30 is the most constricted, i.e., where the open cross-sectional area is smallest.

Figure 5:
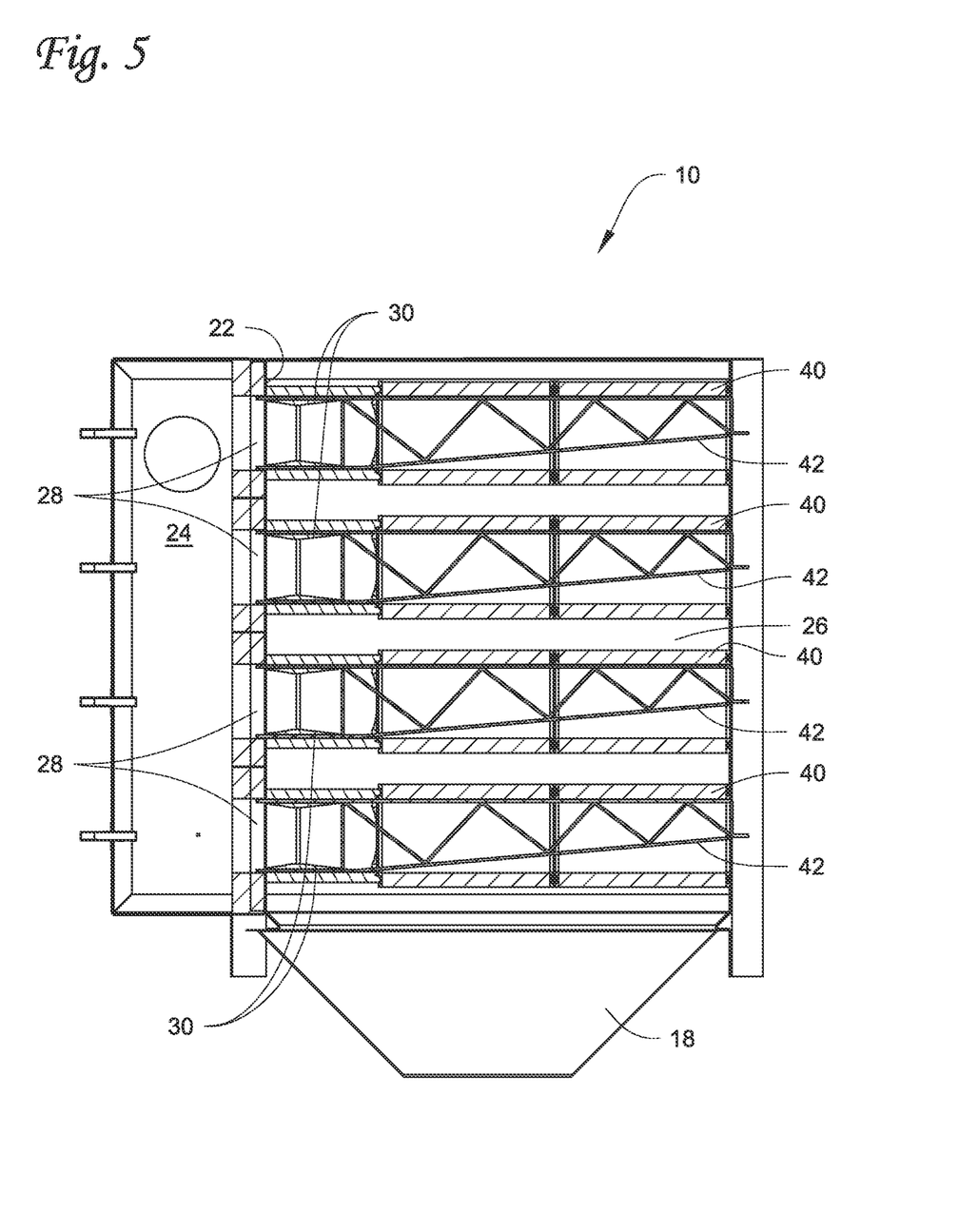
FIG. 5 is a cross-sectional view of the air filter assembly of FIGS. 1-3 taken along line 5-5 in FIG. 3.
Figure 6:
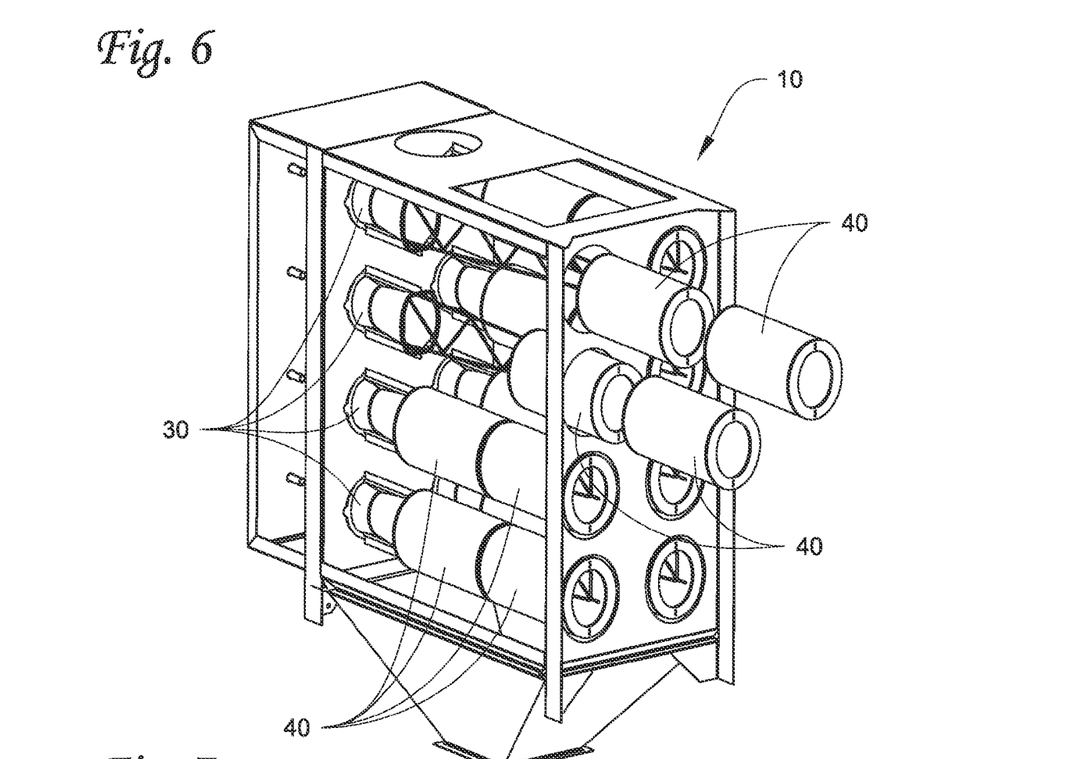
FIG. 6 is partially exploded perspective view of the air filter assembly of FIGS. 1-5.

Referring to FIGS. 5 and 6, which are, respectively, a cross-sectional view of the air filter assembly of FIGS. 1-4 taken along line 5-5 in FIG. 3 and a partially exploded perspective view of the air filter assembly 10 with some of the walls removed to reveal the venturi elements 30 and filter elements 40 located therein.

The openings 28 in the tube sheet 22 over which the venturi elements 30 are positioned are seen in the cross-sectional view of FIG. 5. Also seen in FIG. 5 are yokes 42 attached to the venturi elements 30 and/or the tube sheet 22. The yokes 42 are provided to assist in supporting the filter elements 40 within the housing of the air filter assembly 10. The use of yokes 42 and similar structures for supporting filter elements in an air filter assembly may be described in, e.g., U.S. Pat. No. 3,942,962 (Duyckinck), U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), and U.S. Pat. No. 7,641,708 (Kosmider et al.).

Although the filter elements 40 depicted in FIGS. 4-6 are in the form of two-part cartridges, the air filter assemblies described herein can be adapted to use a variety of filter elements provided the filter elements can be used in conjunction with venturi elements. In one or more embodiments, the filter elements may take the form of, e.g., bags, socks, cartridges, etc.

The blowpipes 20 of the air filter assembly 10 are configured to direct air into the venturi elements 30 through the openings 28 in the tube sheet 22. The air from each of the blowpipes 20 enters the pulse inlet 36 of a corresponding venturi element 30, passes through the throat 32 and exits into the filter element 40 through the pulse outlet 34 to remove particulate matter from the filter elements 40 in a manner similar to that described in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

The blowpipes 20 may be provided as part of a pulse-jet cleaning system including one or more sources of pressurized gas (e.g., air), valves and a control system. Illustrative embodiments of potentially suitable pulse-jet cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

Although the illustrative embodiments of air filter assemblies depicted in FIGS. 4-6 include venturi elements 30 that are located within the dirty air chamber 26, the air filter assemblies described herein may include designs in which the portions or even all of the venturi elements 30 are located in the clean air chamber 24 rather than the dirty air chamber 26.

Figure 7:
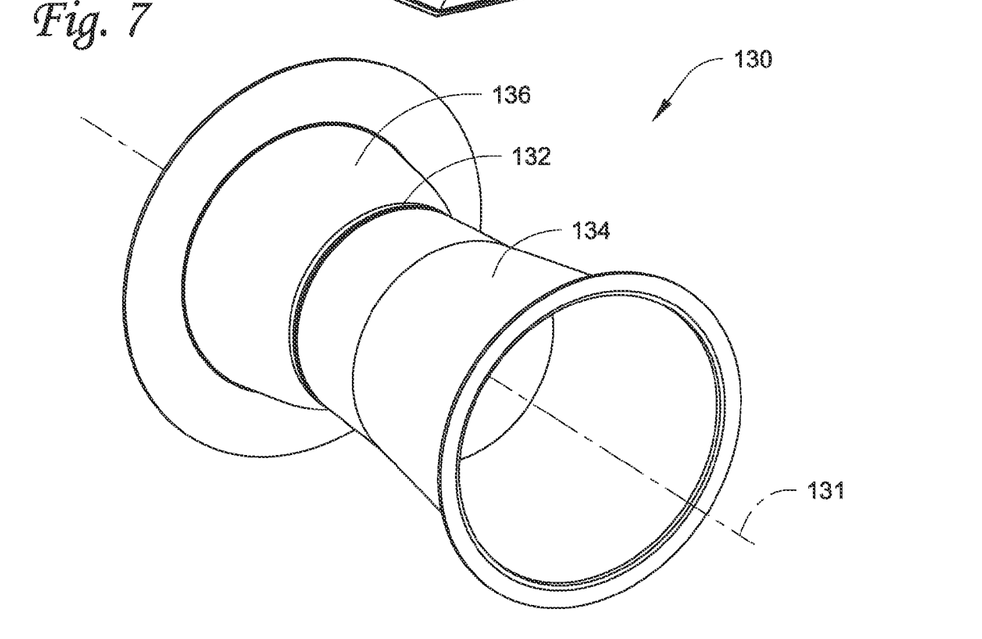
FIG. 7 is a perspective view of one illustrative embodiment of a venturi element that can be used in the air filter assemblies described herein.
Figure 8:
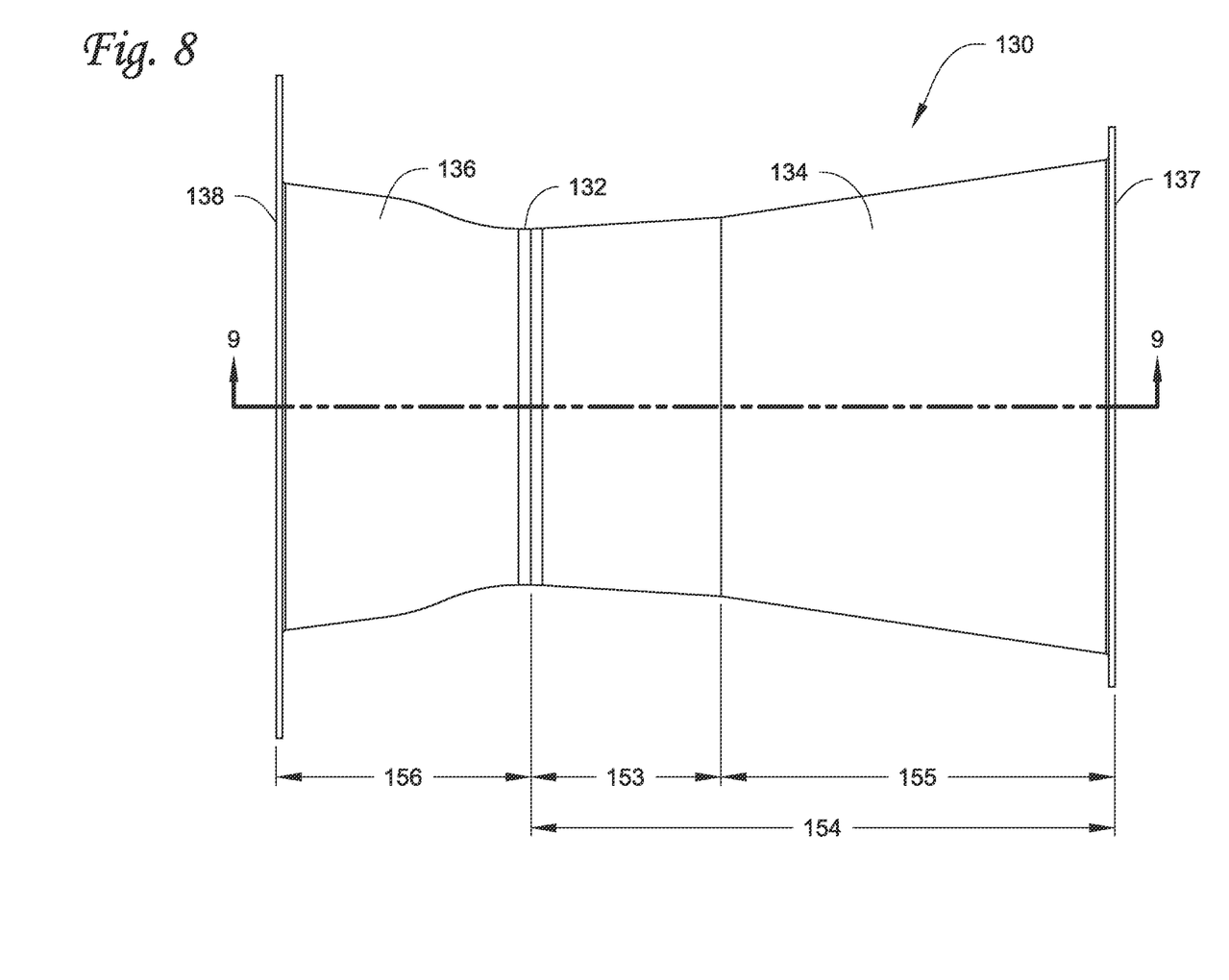
FIG. 8 is a side view of the venturi element of FIG. 7.
Figure 9:
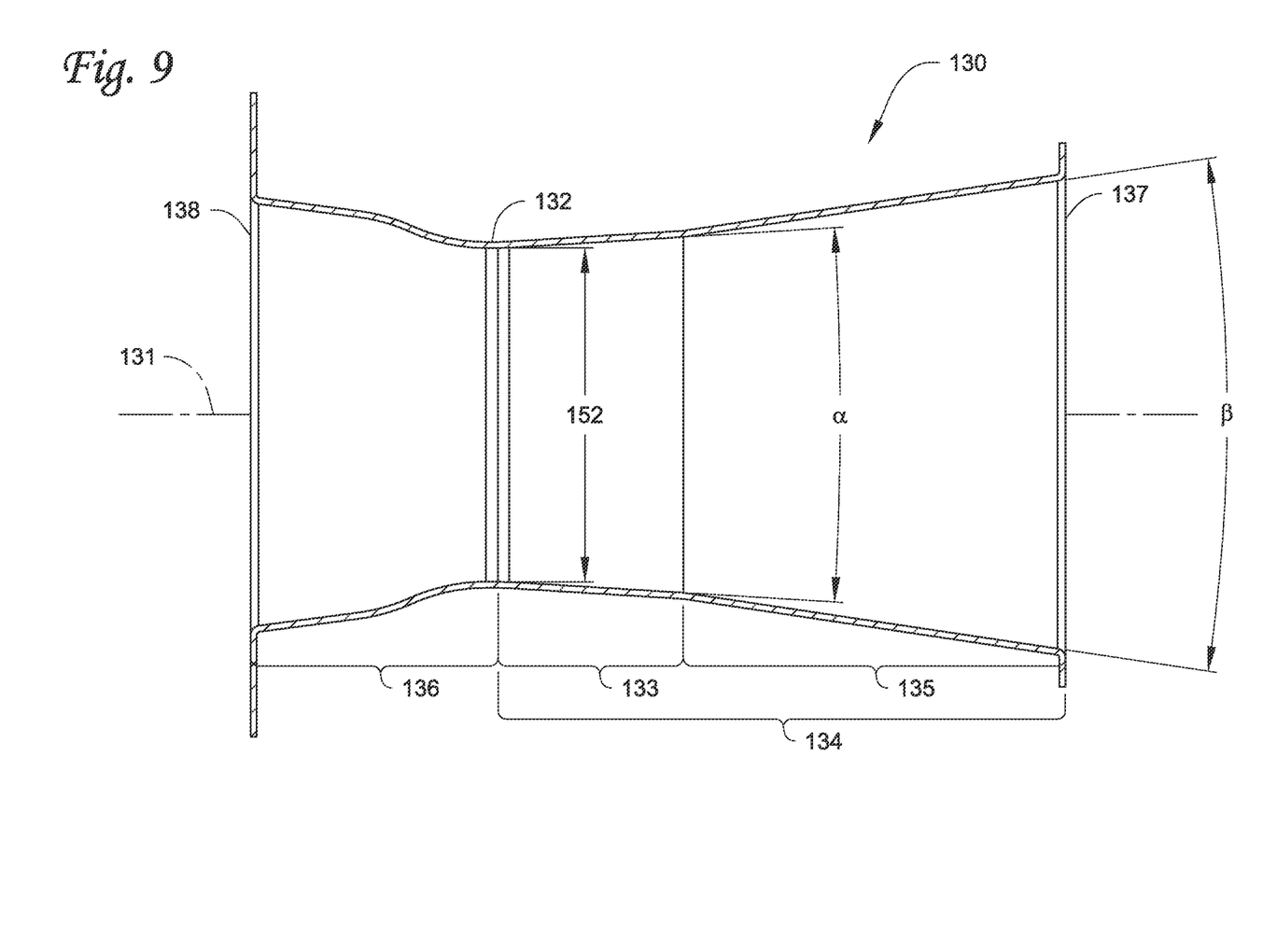
FIG. 9 is a cross-sectional view of the venturi element of FIGS. 7 and 8 taken along line 9-9 in FIG. 8.
Figure 10:
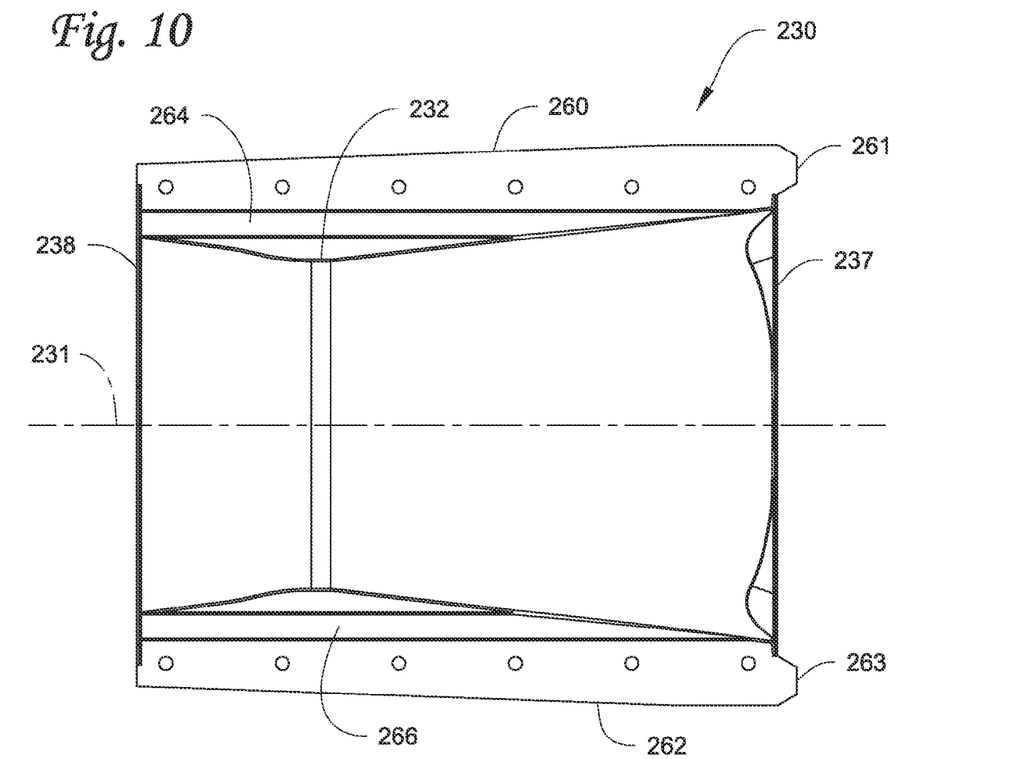
FIG. 10 is a side view of another illustrative embodiment of a venturi element that can be used in the air filter assemblies described herein.
Figure 11:
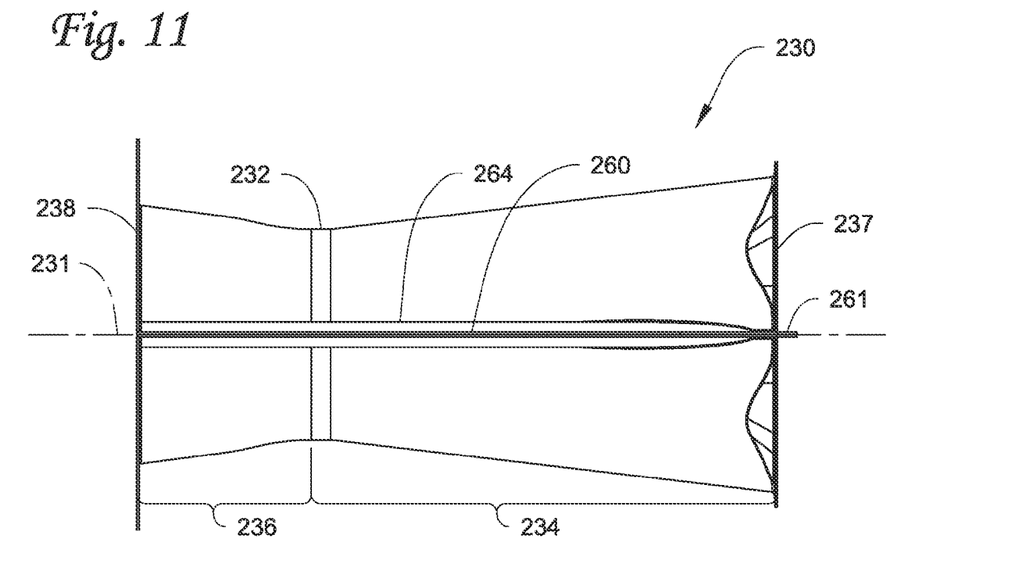
FIG. 11 is a top view of the venturi element of FIG. 10.
Figure 12:
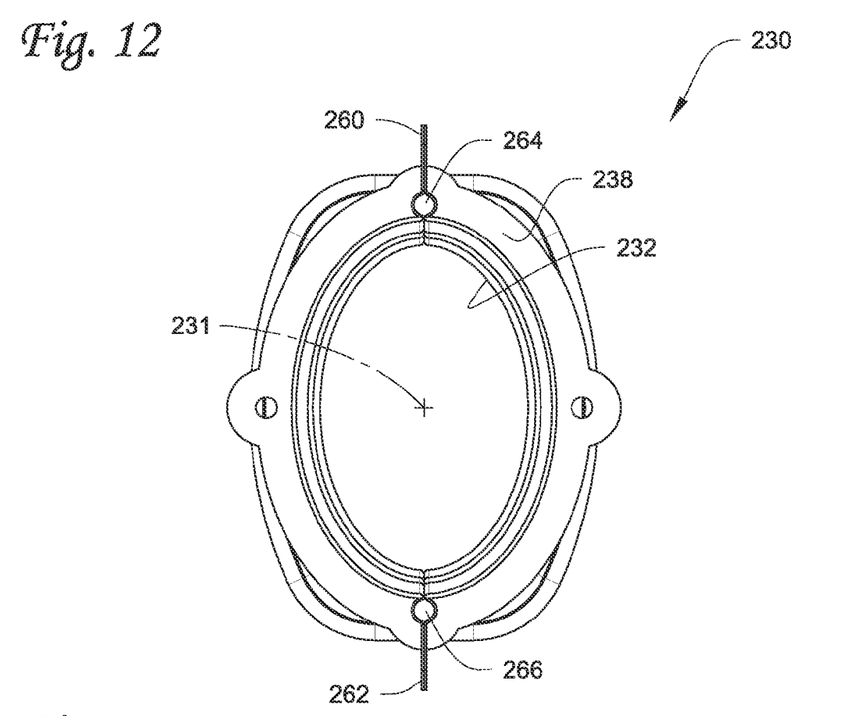
FIG. 12 is an end view of the venturi element of FIGS. 10 and 11 taken from the left side of FIG. 10.
Figure 13:
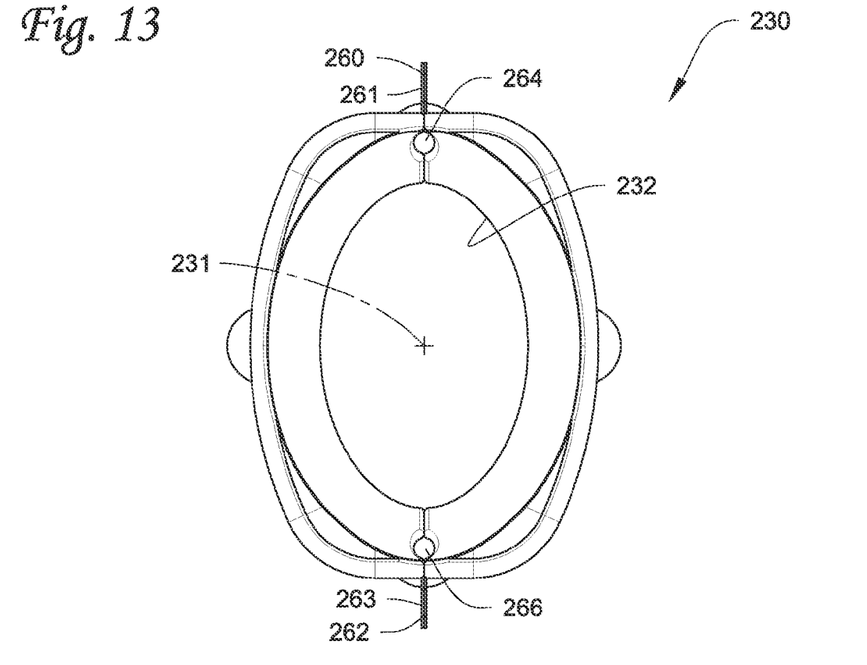
FIG. 13 is an end view of the venturi element of FIGS. 10 and 11 taken from the right side of FIG. 10.

Referring to FIGS. 7-9, one illustrative embodiment of a venturi element that may be used in the air filter assemblies described herein is depicted. The venturi element 130 includes a throat 132 located between a pulse inlet 136 and a pulse outlet 134. A venturi axis 131 extends through a geometric center of the throat 132 and the geometric center of a distal end 137 of the pulse outlet 134. In a venturi element 130 in which the throat 132, pulse outlet 134 and pulse inlet 136 all have circular cross-sectional shapes, the geometric center of these features coincide with the center of the circles defining the cross-sectional shapes.

The throat 132 can, in one or more embodiments, have a length measured along the venturi axis 131 while in other embodiments, the throat 132 may have no length, i.e., the throat may be limited to the point at which the cross-sectional area of the venturi element 130 reaches a minimum, i.e., where the pulse outlet 134 and the pulse inlet 136 meet. In one or more embodiments where the throat 132 does have a length, the length may be, e.g., about 3 inches or less. In one or more embodiments where the throat 132 does have a length, the length may be, e.g., about 0.5 inches or less.

The pulse outlet 134 of the venturi element 130 includes a first expansion region 133 and a second expansion region 135 (see, e.g., FIG. 9). The first expansion region 133 is located between the throat 132 and the second expansion region 135 of the pulse outlet. In the first expansion region 133, the opposing walls of the venturi element diverge at a first angle α (alpha) while in the second expansion region 135, the opposing walls of the venturi element 130 diverge at a second angle β (beta). In one or more embodiments of venturi elements as described herein, the first angle α (alpha) of the first expansion region 133 may be smaller than the second angle β (beta) of the second expansion region 135.

In one or more embodiments, the first angle α (alpha) may be, e.g., about 15 degrees or less on an upper end. In one or more embodiments, the first angle α (alpha) may be, e.g., about 10 degrees or less on an upper end. In one or more embodiments, the first angle α (alpha) may be, e.g., about 1 degree or more on a lower end. In one or more embodiments, the first angle α (alpha) may be, e.g., about 5 degrees or more on a lower end.

In one or more embodiments, the second angle β (beta) may be, e.g., about 30 degrees or less on an upper end. In one or more embodiments, the second angle β (beta) may be, e.g., about 20 degrees or less on an upper end. In one or more embodiments, the second angle β (beta) may be, e.g., about 3 degrees or more on a lower end. In one or more embodiments, the second angle β (beta) may be, e.g., about 7 degrees or more on a lower end.

In one or more embodiments, the first expansion region 133 can be characterized in terms of its length along the venturi axis 131, where the length is measured between cross-sectional planes oriented transverse to the venturi axis 131. In one or more embodiments, the length 155 of the second expansion region 135 may be greater than the length 153 of the first expansion region 133.

In another manner of characterizing the length 153 of the first expansion region 133 of the pulse outlet 134 of the venturi element 130, the length 153 of the first expansion region may, in one or more embodiments, be about 1.5 times or less of the diameter 152 of the throat 132 of the venturi element 130 at the upper end. In one or more embodiments, the length 153 of the first expansion region 133 may be, e.g., about 0.75 times or less of the diameter 152 of the throat 132 of the venturi element 130 at the upper end. In one or more embodiments, the length 153 of the first expansion region 133 may be, e.g., about 0.25 times or more of the diameter 152 of the throat 132 of the venturi element 130 at the lower end. In one or more embodiments, the length 153 of the first expansion region 133 may be, e.g., about 0.56 times the diameter 152 of the throat 132 of the venturi element 130.

In one or more embodiments, the total length 154 of the pulse outlet 134 of the venturi element 130 may be, e.g., about four times the diameter 152 of the throat 132 or less at an upper end. In one or more embodiments, the total length 154 of the pulse outlet 134 of the venturi element 130 may be, e.g., about 2.5 times the diameter 152 of the throat 132 or less at an upper end. In one or more embodiments, the total length 154 of the pulse outlet 134 of the venturi element 130 may be, e.g., about two times the diameter 152 of the throat 132 or more at a lower end. In one or more embodiments, the maximum angle formed by any portion of the pulse outlet 134 may be about 15 degrees or less.

In one or more embodiments, the second expansion region 135 may not be included as a part of the pulse outlet 134. In other words, the second expansion region 135 may be optional, with the first expansion region 133 constituting the entire pulse outlet 134.

In one or more embodiments, the venturi element 130 may include a pulse outlet 134 with an opening at the distal end 137 that matches the opening shape (e.g., the geometry and size) of a filter element positioned at the distal end 137 of the venturi element 130 to receive a pulse of air delivered into the pulse inlet 136 of the venturi element 130. In one or more embodiments, for example, any difference between the inside perimeter of the distal end 137 of the venturi element 130 may be about 0.5 inches or less than the inside dimension of an abutting filter element opening. In one or more embodiments, any difference between the inside perimeter of the distal end 137 of the venturi element 130 may be about 0.375 inches or less than the inside dimension of an abutting filter element opening. Reducing any size differences between the opening of the pulse outlet 134 at the distal end 137 and the abutting filter element can improve fluid flow dynamics into the filter element.

In one or more embodiments, the pulse outlet 134 of the venturi element 130 may have a pulse outlet length 154 that is larger than a pulse inlet length 156, where the pulse inlet length 156 is measured from a distal end 138 of the pulse inlet 136 to the throat 132 along the venturi axis 131.

In one or more embodiments, the second length 155 of the second expansion section 135 may be greater than the pulse inlet length 156.

Although the illustrative embodiment of the venturi element 130 depicted in FIGS. 7-9 has a circular cross-sectional shape along its length from the distal end 138 of the pulse inlet 136 to the distal end 137 of the pulse outlet 134, one or more other embodiments of venturi elements as described herein may include at least a pulse outlet that has an opening at its distal end that is non-circular. In particular, one or more embodiments of venturi elements as described herein may include at least a non-circular cross-sectional opening at the distal end of the pulse outlet.

As described herein, the shapes of the various portions of the venturi elements are taken in cross-sectional planes that are preferably oriented generally transverse to a venturi axis unless otherwise stated.

One illustrative embodiment of a venturi element with a non-circular opening at the distal end of a pulse outlet is depicted in FIGS. 10-15. The depicted venturi element 230 has a generally oval cross-sectional shape along its length that may be selected to match, e.g., a filter element that may have an opening with a similar cross-sectional shape. Some examples of filter elements with oval cross-sectional openings and shapes are described in, e.g., U.S. Pat. No. 7,641,708 (Kosmider et al.).

The venturi element 230 includes a throat 232 with a pulse outlet 234 on one side and a pulse inlet 236 on the opposite side of the throat 232. The venturi element 230 also defines a venturi axis 231 that extends through the geometric centers of the cross-sectional shapes defined by at least the throat 232 and pulse outlet 234.

Another optional feature of venturi elements as described herein and depicted in connection with the venturi element 230 of FIGS. 10-15 is the sectional construction of the venturi element 230. In other words, the venturi element 230 is a composite of two halves (see, e.g., FIG. 15) that are joined together, in the depicted embodiment, along fins 260 and 262 through the use of any suitable fastening technique or techniques (e.g., mechanical fasteners (e.g., bolts, screws, rivets, clamps, etc.), welding, adhesives, etc. Although the depicted venturi element 230 is constructed of two halves joined together, other embodiments may be provided that are the composite of three, four or more sections that are joined together. Further, although the two halves of venturi element 230 are joined together along fins 260 and 262, the use of fins is not required and alternative techniques of joining the components together may be substituted for fins.

Although the shape of the opening at the distal end 237 of the pulse outlet 234 is non-circular to match the shape of the opening into a filter element as discussed herein, the throat 232 and/or the pulse inlet 236 may or may not match the non-circular shape of the opening at the distal end 237 of the pulse outlet 234. For example, the opening at the distal end 238 of the pulse inlet 236 may be a circular or a non-circular shape that does not match the shape of the opening at the distal end 237 of the pulse outlet 234. Similarly, the throat 232 may be circular or a non-circular shape that does not match the shape of the opening at the distal end 237 of the pulse outlet 234.

In the illustrative embodiment of FIGS. 10-15, however, the cross-sectional shapes of the throat 232, the pulse outlet 234 and the pulse inlet 236 are all non-circular and may be chosen to match the shape of an opening into a filter element as described herein. Although the non-circular cross-sectional shapes of the throat 232, the pulse outlet 234 and the pulse inlet 236 are all matching (i.e., are all generally oval in shape), in one or more other embodiments, the cross-sectional shapes of the different portions of the venturi elements described herein may not match each other.

When incorporated into an air filter assembly that includes a pulse-jet cleaning system having blowpipes (see, e.g., blowpipes 20 in FIGS. 2-6), the blowpipes 20 may be pulse-shaping blow pipes (such as, e.g., those described in U.S. Pat. No. 8,075,648 (Raether)) selected to match the cross-sectional shape of the opening at the distal end 238 of the pulse inlet 236. For example, if the cross-sectional shape of the opening at the distal end 238 of the pulse inlet 236 is generally oval, then the blowpipe configured to direct pulsed air into the inlet 236 may be configured to deliver a generally oval shaped pulse (see, e.g., FIG. 3 of U.S. Pat. No. 8,075,648).

As discussed herein, the venturi element 230 may include a pulse outlet 234 with an opening at the distal end 237 that matches the opening shape (e.g., the geometry and size) of a filter element positioned at the distal end 237 of the venturi element 230 to receive a pulse of air delivered into the pulse inlet 236 of the venturi element 230. In one or more embodiments, any difference between the inside perimeter of the distal end 237 of the venturi element 230 and the inside edge of the opening of a filter element attached thereto may be about 0.5 inches or less. In one or more embodiments, any difference between the inside perimeter of the distal end 237 of the venturi element 230 may be about 0.375 inches or less than the inside dimension of an abutting filter element opening. Reducing any size differences between the opening of the pulse outlet 234 at the distal end 237 and the abutting filter element can improve fluid flow dynamics into the filter element.

Yet another optional feature of venturi elements as described herein and depicted in connection with the venturi element 230 of FIGS. 10-15 are protrusions 261 and 263 located on the ends of fins 260 and 262 at the distal end 237 of the pulse outlet 234. The protrusions 261 and 263 may be sized, shaped and positioned to fit within a corresponding recess in a filter element (see, e.g., filter elements 240 in FIGS. 4-6) attached to the distal end 237 of the pulse outlet 234. The protrusions 261 and 263 may restrict rotation or other displacement of a filter element relative to the venturi element 230. The depicted protrusions 261 and 263 may be integrally formed in one or both portions that make up each of the fins 260 and 262.

Still another optional feature of venturi elements as described herein and depicted in connection with the venturi element 230 of FIGS. 10-15 is the connection between the yoke 240 and the venturi element 230. In this illustrative embodiment, the venturi element 230 includes channels 264 and 266 that are configured to receive the support members 242 of the yoke 240. The exterior surfaces of one or both of the channels 264 and 266 are depicted in, e.g., FIGS. 10, 11, 14, and 15. The interiors of the channels 264 and 266 are depicted in, e.g., FIGS. 12, 13, and 15.

Figure 14:
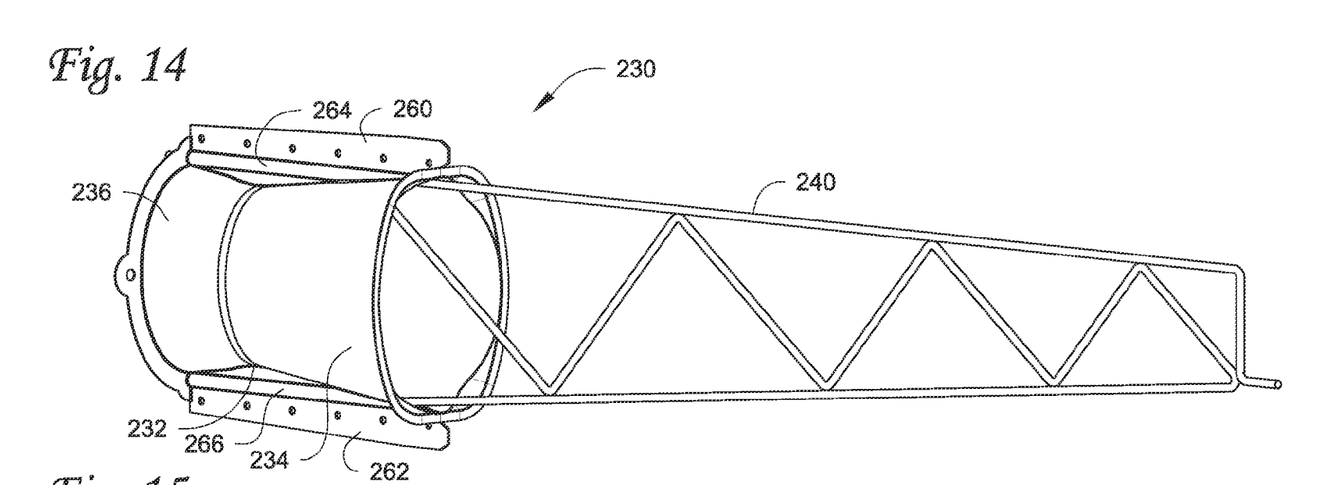
FIG. 14 is a perspective view of the venturi element of FIGS. 10-13 with a yoke used to support a filter element in an air filter assembly as described herein.
Figure 15:
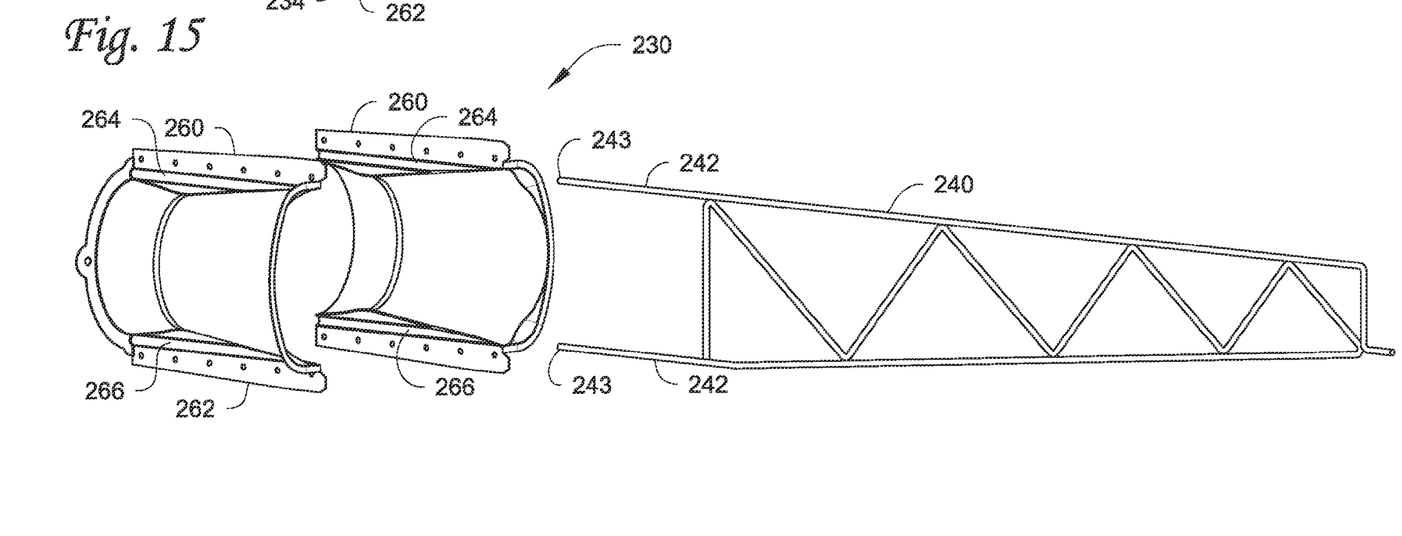
FIG. 15 is an exploded perspective view of the venturi element and yoke of FIG. 14.

In the depicted embodiment of venturi element 230, the yoke 240 does not protrude within the interior space defined by the throat 232 or the pulse inlet 236. Portions of the support member 242 do, however, protrude into the interior space defined by the pulse outlet 234.

In one or more embodiments, the channels 264 and 266 extend through the venturi element 230 such that the distal ends 243 of the support members 242 may be connected directly to a tube sheet in the air filter assembly (see, e.g., tube sheet 22 in the air filter assembly 10 of FIGS. 1-6).

Although the yoke 240 includes two support members 242, other yokes may include more than two support members and/or may be connected to the venturi element by another technique. In one or more embodiments in which the venturi elements are provided in more than two sections, it may be possible to provide more than two channels that can be formed as the different portions of the venturi element are assembled (e.g., a three-part venturi element may be configured to form three channels at the junctions between the different pieces of the venturi element).

Although not specifically described herein, the venturi elements used in the air filter assemblies described herein may be attached to tube sheets and filter elements by any suitable technique or combination of techniques. The illustrative embodiments of the venturi elements described herein include flanges at the distal ends of the pulse outlets and pulse inlets that may facilitate attachment between the venturi elements, tube sheets and filter elements in manners that limit leakage through those junctions.

The venturi elements described herein may, in one or more embodiments, be used in one or more air filter assemblies such as those described in U.S. Provisional Patent Application No. 61/648,494, filed on May 17, 2012.

The complete disclosure of the patents, patent documents, and publications identified herein are incorporated by reference in their entirety as if each were individually incorporated.

Illustrative embodiments of the filter assemblies and methods of using the filter assemblies are discussed and reference has been made to possible variations. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

The invention claimed is:

1. An air filter assembly comprising:
   a housing comprising a tube sheet separating the housing into a dirty air chamber and a clean air chamber;
   a plurality of venturi elements attached to the tube sheet, wherein each venturi element of the plurality of venturi elements comprises a throat located between a pulse inlet and a pulse outlet, wherein a venturi axis extends through a geometric center of the throat and a distal end of the pulse outlet;
   a plurality of apertures in the tube sheet, wherein each venturi element of the plurality of venturi elements is positioned over or through an aperture in the tube sheet such that air passing from the dirty air chamber into the clean air chamber through each venturi element of the plurality of venturi elements passes through the aperture; and
   a plurality of filter elements, wherein each filter element of the plurality of filter elements is positioned at the distal end of the pulse outlet of a venturi element to receive air passing out of the pulse outlet of each venturi element of the plurality of venturi elements;
   wherein the pulse outlet of each venturi element of the plurality of venturi elements comprises a first expansion region and a second expansion region, wherein the first expansion region is located between the throat and the second expansion region, wherein the first expansion region is located directly adjacent the throat when moving along the venturi axis from the throat towards the second expansion region, and wherein the second expansion region is located directly adjacent the first expansion region when moving along the venturi axis from the throat towards the second expansion region;
   wherein the first expansion region comprises opposing walls that diverge at a first angle;
   wherein the second expansion section comprises opposing walls that diverge at a second angle that is larger than the first angle;
   and wherein the second expansion section comprises a second length along the venturi axis that is greater than a first length of the first expansion section along the venturi axis.

2. An assembly according to claim 1, wherein the pulse outlet of each venturi element of the plurality of venturi elements comprises a pulse outlet length along the venturi axis that is larger than a pulse inlet length as measured from a distal end of the pulse inlet to the throat along the venturi axis.

3. An assembly according to claim 1, wherein, for each venturi element of the plurality of venturi elements, the second length of the second expansion section is greater than a pulse inlet length as measured from a distal end of the pulse inlet to the throat along the venturi axis.

4. An assembly according to claim 1, wherein, for each venturi element of the plurality of venturi elements, the first angle is about 15 degrees or less.

5. An assembly according to claim 1, wherein, for each venturi element of the plurality of venturi elements, the second angle is about 7 degrees or more.

6. An assembly according to claim 1, wherein, for each venturi element of the plurality of venturi elements, the first angle is about 15 degrees or less and the second angle is about 7 degrees or more.

7. An assembly according to claim 1, wherein the distal end of the pulse inlet of each venturi element of the plurality of venturi elements is attached to the tube sheet such that the pulse outlet, the throat and the pulse inlet are located in the dirty air chamber.

8. An assembly according to claim 1, wherein the pulse outlet of each venturi element of the plurality of venturi elements comprises a cross-sectional opening shape at the distal end that is non-circular.

9. An assembly according to claim 8, wherein the non-circular cross-sectional opening shape at the distal end of the pulse outlet of each venturi element of the plurality of venturi elements matches an opening shape of the filter element positioned at the distal end of the venturi element.

10. An assembly according to claim 8, wherein the non-circular cross-sectional opening shape at the distal end of the pulse outlet of each venturi element of the plurality of venturi elements matches a non-circular cross-sectional opening shape at the throat of each venturi element.

11. An assembly according to claim 8, wherein the non-circular cross-sectional opening shape at the distal end of the pulse outlet of each venturi element of the plurality of venturi elements matches a non-circular cross-sectional opening shape at a distal end of the pulse inlet of each venturi element.

12. An assembly according to claim 8, wherein the non-circular cross-sectional opening shape at the distal end of the pulse outlet of each venturi element of the plurality of venturi elements matches a non-circular cross-sectional opening shape at the throat of each venturi element, and wherein the non-circular cross-sectional opening shape at the distal end of the pulse outlet of each venturi element of the plurality of venturi elements matches a non-circular cross-sectional opening shape at a distal end of the pulse inlet of each venturi element.

13. An assembly according to claim 1, wherein the assembly further comprises a pulse jet cleaning system comprising a plurality of blowpipes oriented to direct a pulse of air into the pulse inlets and towards the throats of each venturi element of the plurality of venturi elements.

14. An assembly according to claim 13, wherein each blowpipe of the plurality of blowpipes is configured to provide a shaped pulse that matches a cross-sectional opening shape at a distal end of the pulse outlet of each venturi element.

15. An assembly according to claim 13, wherein each blowpipe of the plurality of blowpipes is configured to provide a shaped pulse that matches a cross-sectional opening shape at the throat of each venturi element.

16. An assembly according to claim 13, wherein each blowpipe of the plurality of blowpipes is configured to provide a shaped pulse that matches a cross-sectional opening shape at a distal end of the pulse inlet of each venturi element.

17. An assembly according to claim 1, wherein each venturi element of the plurality of venturi elements comprises one or more channels and wherein a support member of a yoke attached to the venturi element is located within the one or more channels.

18. An air filter assembly comprising:
a housing comprising a tube sheet separating the housing into a dirty air chamber and a clean air chamber;
a plurality of venturi elements attached to the tube sheet, wherein each venturi element of the plurality of venturi elements comprises a throat located between a pulse inlet and a pulse outlet, wherein a venturi axis extends through a geometric center of the throat and a distal end of the pulse outlet;
a plurality of apertures in the tube sheet, wherein each venturi element of the plurality of venturi elements is positioned over or through an aperture in the tube sheet such that air passing from the dirty air chamber into the clean air chamber through each venturi element of the plurality of venturi elements passes through the aperture; and
a plurality of filter elements, wherein each filter element of the plurality of filter elements is positioned at the distal end of the pulse outlet of a venturi element to receive air passing out of the pulse outlet of each venturi element of the plurality of venturi elements;
wherein the pulse outlet of each venturi element of the plurality of venturi elements comprises a cross-sectional opening shape at the distal end that is non-circular.

19. An assembly according to claim 18, wherein the non-circular cross-sectional opening shape at the distal end of the pulse outlet of each venturi element of the plurality of venturi elements matches an opening shape of the filter element positioned at the distal end of the venturi element.

20. An assembly according to claim 18, wherein the non-circular cross-sectional opening shape at the distal end of the pulse outlet of each venturi element of the plurality of venturi elements matches a non-circular cross-sectional opening shape at the throat of each venturi element.

21. An assembly according to claim 18, wherein the non-circular cross-sectional opening shape at the distal end of the pulse outlet of each venturi element of the plurality of venturi elements matches a non-circular cross-sectional opening shape at a distal end of the pulse inlet of each venturi element.

22. An assembly according to claim 18, wherein the non-circular cross-sectional opening shape at the distal end of the pulse outlet of each venturi element of the plurality of venturi elements matches a non-circular cross-sectional opening shape at the throat of each venturi element, and wherein the non-circular cross-sectional opening shape at the distal end of the pulse outlet of each venturi element of the plurality of venturi elements matches a non-circular cross-sectional opening shape at a distal end of the pulse inlet of each venturi element.

23. An assembly according to claim 18, wherein the pulse outlet of each venturi element of the plurality of venturi elements comprises a pulse outlet length along the venturi axis that is larger than a pulse inlet length as measured from a distal end of the pulse inlet to the throat along the venturi axis.

24. An assembly according to claim 18, wherein the pulse outlet of each venturi element of the plurality of venturi elements comprises a first expansion region and a second expansion region, wherein the first expansion region is located between the throat and the second expansion region, wherein the first expansion region comprises opposing walls that diverge at a first angle, and wherein the second expansion section comprises opposing walls that diverge at a second angle that is larger than the first angle.

25. An assembly according to claim 24, wherein, for each venturi element of the plurality of venturi elements, the second expansion section comprises a second length along the venturi axis that is greater than a pulse inlet length as measured from a distal end of the pulse inlet to the throat along the venturi axis.

26. An assembly according to claim 24, wherein, for each venturi element of the plurality of venturi elements, the first angle is about 8 degrees or less.

27. An assembly according to claim 24, wherein, for each venturi element of the plurality of venturi elements, the second angle is about 10 degrees or more.

28. An assembly according to claim 24, wherein, for each venturi element of the plurality of venturi elements, the first angle is about 8 degrees or less and the second angle is about 10 degrees or more.

29. An assembly according to claim 18, wherein the distal end of the pulse inlet of each venturi element of the plurality of venturi elements is attached to the tube sheet such that the pulse outlet, the throat and the pulse inlet are located in the dirty air chamber.

30. An assembly according to claim 18, wherein each venturi element of the plurality of venturi elements comprises one or more channels and wherein a support member of a yoke attached to the venturi element is located within the one or more channels.

* * * * *